(12) United States Patent
Wilczynski et al.

(10) Patent No.: US 10,410,090 B1
(45) Date of Patent: Sep. 10, 2019

(54) MACHINE LEARNING ASSISTANT FOR IMAGE ANALYSIS

(71) Applicant: Palantir Technologies Inc., Palo Alto, CA (US)

(72) Inventors: Peter Wilczynski, San Francisco, CA (US); Joules Nahas, Mountain View, CA (US); Anthony Bak, San Francisco, CA (US); John Carrino, Menlo Park, CA (US); David Montague, East Palo Alto, CA (US); Daniel Zangri, Palo Alto, CA (US); Ernest Zeidman, Palo Alto, CA (US); Matthew Elkherj, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/128,266

(22) Filed: Sep. 11, 2018

Related U.S. Application Data

(60) Provisional application No. 62/721,935, filed on Aug. 23, 2018.

(51) Int. Cl.
*G06K 9/00* (2006.01)
*G06K 9/62* (2006.01)
*G06K 9/46* (2006.01)
*H04N 11/00* (2006.01)

(52) U.S. Cl.
CPC ......... *G06K 9/6257* (2013.01); *G06K 9/4604* (2013.01)

(58) Field of Classification Search
CPC .................................. G06K 9/00; G06T 7/00

USPC ................................. 382/159, 165, 170, 181
See application file for complete search history.

(56) References Cited

U.S. PATENT DOCUMENTS

| 9,342,877 | B2 * | 5/2016 | Coon ........................ G06T 7/00 |
| 9,348,920 | B1 | 5/2016 | Kesin |
| 9,366,639 | B2 * | 6/2016 | Kral et al. |
| 9,898,528 | B2 * | 2/2018 | Kesin .................... G06F 16/334 |
| 2010/0303342 | A1 * | 12/2010 | Berg et al. |
| 2017/0200063 | A1 * | 7/2017 | Nariyambut et al. |
| 2018/0173792 | A1 | 6/2018 | Kesin |

FOREIGN PATENT DOCUMENTS

EP          3037992          6/2016

OTHER PUBLICATIONS

Notice of Allowance for U.S. Appl. No. 15/159,622 dated Oct. 6, 2017.
Official Communication for European Patent Application No. 15201881.8 dated Sep. 27, 2017.
(Continued)

*Primary Examiner* — Abolfazl Tabatabai
(74) *Attorney, Agent, or Firm* — Sheppard Mullin Richter & Hampton LLP

(57) ABSTRACT

Systems, methods, and non-transitory computer readable media are provided for labeling depictions of objects within images. An image may be obtained. The image may include a depiction of an object. A user's marking of a set of dots within the image may be received. The set of dots may include one or more dots. The set of dots may be positioned within or near the depiction of the object. The depiction of the object within the image may be labeled based on the set of dots.

14 Claims, 6 Drawing Sheets

(56) References Cited

OTHER PUBLICATIONS

Official Communication for European Patent Application No. 15201881.8 dated May 23, 2016.
Official Communication for U.S. Appl. No. 14/746,671 dated Sep. 28, 2015.
Official Communication for U.S. Appl. No. 15/159,622 dated May 10, 2017.
Official Communication for U.S. Appl. No. 15/159,622 dated Feb. 24, 2017.

* cited by examiner

MACHINE LEARNING ASSISTANT FOR IMAGE ANALYSIS

CROSS REFERENCE TO RELATED APPLICATIONS

This application claims the benefit under 35 U.S.C. § 119(e) of U.S. Provisional Application Ser. No. 62/721,935, filed Aug. 23, 2018, the content of which is incorporated by reference in its entirety into the present disclosure.

FIELD OF THE INVENTION

This disclosure relates to approaches for labeling depictions of objects within images.

BACKGROUND

Under conventional approaches, users may label objects within images by drawing boundaries of the objects within the images. For example, a user may label buildings within satellite images by drawing polygons that trace the edges of the buildings. The labeled images/labeled objects within images may be used to train image analysis tools, such as image classifiers. However, such labeling processes may be time consuming and difficult to use.

SUMMARY

Various embodiments of the present disclosure may include systems, methods, and non-transitory computer readable media configured to label depictions of objects within images. An image may be obtained. The image may include a depiction of an object. A user's marking of a set of dots within the image may be received. The set of dots may include one or more dots. The set of dots may be positioned within and/or near the depiction of the object. The depiction of the object within the image may be labeled based on the set of dots.

In some embodiments, labeling the depiction of the object within the image based on the set of dots may include identifying a boundary of the object depicted within the image based on position of the set of dots within the image. For example, the position of the set of dots within the image may indicate a middle portion of the object. As another example, the position of the set of dots within the image may indicate a boundary portion of the object. As yet another example, the position of the set of dots within the image may indicate a nearby depiction of the object.

In some embodiments, labeling the depiction of the object within the image may be further based on a number of dots within the set of dots.

In some embodiments, a label of the depiction of the object within the image may be used to train a machine learning model for identifying other depictions of the object within other images. Identifications of the other depictions of the object within the other images may be filtered based on an object size criteria or an object shape criteria.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
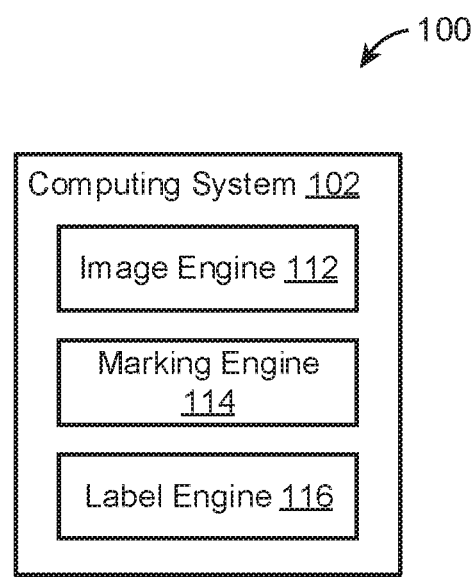
FIG. 1 illustrates an example environment for labeling depictions of objects within images, in accordance with various embodiments.

A claimed solution rooted in computer technology overcomes problems specifically arising in the realm of computer technology. In various implementations, an image may be obtained. The image may include a depiction of an object. A user's marking of a set of dots within the image may be received. The set of dots may include one or more dots. The set of dots may be positioned within and/or near the depiction of the object. The depiction of the object within the image may be labeled based on the set of dots.

In some embodiments, labeling the depiction of the object within the image based on the set of dots may include identifying a boundary of the object depicted within the image based on position of the set of dots within the image. For example, the position of the set of dots within the image may indicate a middle portion of the object. As another example, the position of the set of dots within the image may indicate a boundary portion (e.g., corner, edge) of the object. As yet another example, the position of the set of dots within the image may indicate a nearby depiction of the object.

In some embodiments, labeling the depiction of the object within the image may be further based on a number of dots within the set of dots. For example, higher number of dots may indicate a larger object and/or a greater confidence of the identity of the object.

In some embodiments, a label of the depiction of the object within the image may be used to train a machine learning model for identifying other depictions of the object within images. For example, the object may include a building and the labeling of the depiction of the building within the image may be used to train a machine learning model for identifying depictions of buildings within images. Identification of other depictions of the object within images may be filtered based on an object size criteria or an object shape criteria. For example, a size or a shape of a portion within an image may not correspond to the size or the shape of a building, and this portion within the image may be filtered out from being labeled as a building. The machine learning model may be used to detect changes in objects at a location over time.

The machine learning model may be improved with additional information. For instance, an ontology may be applied to labeling to creating a semantic layer for labels (e.g., an object may be labeled as a building and/or a particular type of building). Data preparation techniques may be used to enhance and/or clean-up data used for training the machine learning model and/or analysis performed by the machine learning model. Prior labeling of objects in the same and/or different images may be used to improve the machine learning model. Data from different types of databases may be used as inputs to the machine learning model. For example, da database that identifies geolocations of objects may be used as inputs for identifying/confirm object locations. The machine learning model may be trained to account for images that are captured at different times of day and/or during different seasons.

The approaches disclosed herein facilitates labeling of images to be used in training tools for image analysis and object detection. Positions of dots marked within images may be used to identify objects within the images and label the images. The labeled images/labeled objects within images may be used to train image analysis tools (e.g., image classifiers), which may be used to identify objects within other images. Marking dots within images to identify positions of objects within the images may take less amount of time and may be easier to use than drawings polygons that trace the edge of objects within the images.

While the disclosure is described herein with respect to depictions of buildings within images, this is merely for illustrative purposes and is not meant to be limiting. The techniques described herein may apply to labeling and/or identification of other objects depicted within images.

FIG. 1 illustrates an example environment 100 for labeling depictions of objects within images, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include an image engine 112, a marking engine 114, a label engine 116, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the image engine 112 is configured to obtain one or more images. Obtaining an image may include accessing, acquiring, analyzing, determining, examining, identifying, loading, locating, opening, receiving, retrieving, reviewing, storing, and/or otherwise obtaining the image. An image may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). An image may be obtained from one or more databases. An image may be stored within a single file or across multiple files. For example, an image have been ingested into a database as one or more objects, and the image engine 112 may retrieve the object(s) to obtain the image.

In some embodiments, the image engine 112 may obtain an image based on a user's interaction with a user interface. The user interface may enable a user to select one or more images to be obtained by the image engine 112. For example, the user interface may provide one or more tools by which the user may browse through one or more file directories and select one or more files of image(s). As another example, the user interface may provide one or more tools by which the user may select one or more content and image(s) with the selected content may be obtained by the image engine 112 and/or presented to the user for selection. For example, the user interface may enable the user to select a location (e.g., geographic area) as the desired content, such as by entering a name, an identifier, geographic a coordinate and/or other information that identifies and/or is associated with the location, and image(s) of the location may be obtained by the image engine 112 and/or presented to the user for selection. As another example, the user interface may display a view (e.g., satellite map, street map, topographical map, climate map, etc.) of a geographic area. The user interface may enable a user to select a location, such as by clicking/tagging a location and/or drawings a shape that defines the location, and image(s) of the location may be obtained by the image engine 112 and/or presented to the user for selection. Other selection of images to be obtained by the image engine 112 are contemplated.

An image obtained by the image engine 112 may include one or more depictions of one or more objects. An object may refer to a living object or a non-living object. An object may include a man-made object or a natural object. A depiction of an object within an image may refer to a portion (e.g., pixels) of the image that visually represents the object. An image may include a depiction of an object based on the object being located within a field of view of an image capture device (e.g., camera, image sensor) that captured the image. For example, an image obtained by the image engine 112 may include an image of a location. The location at the time of image capture may have included one or more objects, such as person(s), animal(s), plant(s), vegetation(s), vehicle(s), road(s), structure(s), building(s), road(s), terrain(s), and/or other objects within the field of view of the image capture device, and such object(s) may be depicted within the image. Images including depictions of other objects are contemplated.

In various embodiments, the marking engine 114 is configured to receive a user's marking of one or more sets of dots within an image. A set of dots may be marked within an image obtained by the image engine 112. A set of dots may include one or more dots. The marking engine 114 may receive the user's marking of set(s) of dots during the user's marking of the set(s) of dots within the image or after the user's marking of the set(s) of dots within the image. That is, the marking engine 114 may receive the user's marking in real-time (as the marking is performed by the user) or after the user's marking is completed. For example, the image may be presented to the user within a user interface, and the user interface may provide one or more tools by which the user may mark the set(s) of dots within the image. For instance, the user may interact with the user interface by moving a cursor to a portion of the image and clicking on the portion to mark one or more dots at the portion. In another instance, the user interface may be presented on a touch interface (e.g., touchscreen) and the user may mark one or more dots at the portion of the image by engaging with the touch interface. The marking engine 114 may receive the user's marking of set(s) of dots within the image as the user makes the marking or after the user has indicated that the marking is complete.

As another example, the user's marking of set(s) of dots within an image may be performed using data that is created independent of the image. For instance, a database may include position information (e.g., geographic coordinates) of buildings in a particular location (e.g., country, state, city, city block, zip code). A user may mark one or more sets of dots within an image by using the position information within the database. That is, rather than manually marking dots within the image to indicate depictions of buildings within the image, the user may use the position information within the database to mark dots within the image. The user may select the desired data/database which includes the position information, and the marking engine 114 may determine the correspondence between pixels of the image and locations in the real world to determine where dots should be positioned within the image based on the position information. For example, a database may include geographic coordinates of schools in a city, and the geographic coordinates of the school may be used to determine where dots should be marked within an image of the city. As another example, a database may include geographic coordinates of different types of buildings in a city block, and the geographic coordinates of the different types of buildings may be used to determine where and/or what types of dots should be marked within an image of the city block.

A set of dots may be positioned within a depiction of an object within an image. That is, one or more dots may be positioned within a portion of the image (grouping of pixels) that visually represents the object. For example, the image may include a depiction of a building and the dot(s) may be positioned within the portion of the image depicting the building. In some embodiments, the positions of the dot(s) within the image may indicate a particular portion of the object depicted within the image. For example, the position of the set of dots within the image may indicate a middle portion of a building depicted within the image. As another example, the position of the set of dots within the image may indicate a boundary portion (e.g., corner, edge) of a building depicted within the image.

A set of dots may be positioned near a depiction of an object within an image. That is, one or more dots may be positioned near a portion of the image that visually represents the object. For example, the dot(s) may be positioned adjacent to or within a short distance of a portion of an image depicting a building. The position(s) of the dot(s) within the image may indicate position(s) from which to search for the object depicted within the image. For example, the position of the set of dots within the image may be used to define an area within which to search for a building depicted within the image.

Use of dots to mark positions of objects depicted within an image may facilitate users' marking of images. Use of dots to mark positions of objects depicted within an image may be faster and more intuitive than other methods of marking positions of objects. For example, an alternative method of marking positions of objects depicted within an image may include requiring a user to trace along the outer edge of the objects. However, such marking of images may be difficult, prone to error, and time-consuming. Use of dots to mark positions of objects depicted within an image may also enable the use of existing information to mark images. For example, known geographic coordinate of buildings within a location may be converted into dots marking positions of the buildings within the image.

In some embodiments, marking of different types of dots may be received by the marking engine 114. Different types of dots may indicate different types of objects depicted within an image and/or different characteristics of objects depicted within an image. For example, an image may include depictions of buildings and vehicles, and the user may mark the positions of buildings depicted within the image with one type of dots and mark the positions of vehicles depicted within the image with another type of dots. As another example, an image may include depictions of different types of buildings (e.g., buildings with different shapes, buildings with different purposes, commercial vs residential vs government buildings) and the user may mark the positions of different types of buildings depicted within the image with different types of dots. Such use of different types of dots may facilitate labeling of the image with different information. For example, use of different types of dots to indicate different types of building may facilitate labeling the image with both positions of the buildings and the type of buildings depicted within the image.

In various embodiments, the label engine 116 is configured to label a depiction of an object within a image based on a set of dots. For example, an image may include depictions of multiple buildings, and the marking engine 114 may receive a user's marking of sets of dots within the image, with individual sets of dots positioned within individual depictions of the buildings. Various depictions of the buildings within the image may be labeled based on the sets of dots positioned within the depictions. Labeling a depicting of an object within an image may include identifying a portion (e.g., pixels) of the image that visually represents object based on a set of dots. For example, labeling a depiction of a building within an image may include identifying which portion of the image visually represents the building based on a set of dots. Identifying of the portion of the image may include use of a classifier (e.g., neural network). For example, a window of pixels around the set of dots may be fed into a classifier, and the classifier may determine one or more probabilities of the window of pixels depicting one or more particular objects (e.g., probabilities that the pixels within the window include a roof of a building). As another example, one or more polygon filling techniques (e.g., flood fill, boundary fill) may be used to identify the portion of the image that visually represents the object. As further example, one or more edge detection techniques may be used to identify edges of the portion of the image that visually represents the object. Other identification techniques are contemplated.

In some embodiments, labeling a depiction of an object within an image may be performed in one or more background jobs/processes such that labeling the depiction of the object does not impact a user's marking of the image. Rather than having the user wait for labeling of a depiction of an object based on individual marking of dots within the image, the labeling may be performed in the background so that the user may mark the image without waiting for labeling.

In some embodiments, labeling a depiction of an object within an image based on the set of dots may include identifying a boundary of the object depicted within the image based on position of the set of dots within the image. For example, the position of the set of dots within the image may indicate a middle portion of the object. The labeling process may be weighed such that the portion of the image identified to visually represent the object may be biased to be centered on the set of dots. As another example, the position of the set of dots within the image may indicate a boundary portion (e.g., corner, edge) of the object. The labeling process may be weighed such that the portion of the image identified to visually represent the object may be biased to be extended/bounded by the set of dots. As yet another example, the position of the set of dots within the image may indicate a nearby depiction of the object. The labeling process may be weighed such that the portion of the image identified to visually represent the object may be biased to be near the set of dots. Other biasing of image portion identification and/or labeling based on position of a set of dots are contemplated.

In some embodiments, labeling a depiction of an object within an image may be further based on a number of dots within the set of dots. That is, a depiction of an object may be labeled differently based on different numbers of marked dots. For example, higher number of dots within a set of dots may indicate a larger object (e.g., larger building) and/or a greater confidence of the identity of the object (e.g., greater confidence that the object is a building), while lower number of dots within a set of dots may indicate a smaller object (e.g., smaller building) and/or a less confidence of the identity of the object (e.g., less confidence that the object is a building).

In some embodiments, labeling a depiction of an object within an image may be further based on a type of dots within the set of dots. For example, different types of dots may indicate different types of objects (e.g., buildings vs vehicles) depicted within an image and/or different characteristics of objects (e.g., buildings with different shapes, buildings with different purposes, commercial vs residential vs government buildings) depicted within an image. The depiction of the object within the image may be labeled with different information (e.g., whether it is a building or a vehicle, the type of building or vehicle) based on the type of dots within the set of dots.

In some embodiments, labeling a depiction of an object within an image may be further based on information associated with a set of dots. For example, a set of dots may be marked based on information within a database that provides geographic coordinates of different types of building. In addition to or as an alternative to labeling a depiction of a building within an image as a building based on such a geographic coordinate, the depiction of the building within the image may be labeled with information on the particular type of building. As another example, the database or another database may include information associated with the building, such as building characteristics, and the depiction of the building within the image may be labeled with the associated information. For instance, multiple databases may include different information about a building depicted within an image. One database may include information on geographic coordinate of the building while another database may include information on characteristics (e.g., building type, building height, building size, building capacity) of the building. The geographic coordinate of the building may be used to determine the position of the depiction of the building within an image while the characteristics of the building may be used to label and/or augment the labeling of the depiction of the building within the image.

In some embodiments, a label of a depiction of an object within an image may be used to train a machine learning model for identifying other depictions of the object within other images. That is, the labeling performed by the label engine 116 may be used as an input to train a machine learning model (classifier), which may then be used to identify other depictions of the object. For example, the object may include a building and the labeling of the depiction of the building within the image may be used to train a machine learning model for identifying depictions of buildings within images. In some embodiments, training of the machine learning model may be updated based on passage of time. That is, if labels for a particular location has not been refreshed in a certain amount of time, new data may be required/requested to generate updated labels for the location.

In some embodiments, the machine learning model's identification of other depictions of the object within images may be filtered based on an object size criteria and/or an object shape criteria. An object size criteria may refer to one or more size standards by which a portion of an image may be prevented from being identified as the object. For example, an object size criteria may define a maximum size criteria and/or a minimum size criteria. A portion of an image may be prevented from being identified as the object based on the portion being bigger than the maximum size criteria or smaller than the minimum size criteria. For instance, a portion of an image may be too small or too big to be a building, and this portion of the image may be filtered out from being labeled as a building by the machine learning model.

An object shape criteria may refer to one or more shape standards by which a portion of an image may be prevented from being identified as the object. For example, an object shape criteria may define shape (dimension) criteria. A portion of an image may be prevented from being identified as the object based on the portion not matching the shape criteria, with the shape criteria defining one or more acceptable shape(s)/range(s) of shape(s) for the objects, or based on the portion matching the shape criteria, with the shape criteria defining one or more unacceptable shape(s)/range(s) of shape(s) for the objects. For instance, a portion of an image may be too oblong to be a building, and this portion of the image may be filtered out from being labeled as a building by the machine learning model.

In some embodiments, the machine learning model may be customized based on user input. For example, user input may be received to determine the sensitivity of the model (e.g., user input is used to determine the level of probability that is accepted to identify an object), to determine one or more criteria by which images are filtered (e.g., user input is used to determine acceptable/unacceptable building sizes and/or shapes), and/or to provide for false positive elimination.

In some embodiments, the machine learning model may use feedback from users to improve its classifications and/or results. For example, the machine learning model may change the sensitivity of object detection based on user feedback. For instance, the machine learning model may output probabilities of different portions of an image including a depiction of an object, such as between zero (not a building) and one (a building). The image may be presented with one or more visual markers that indicate the probabilities, such as greyscale that indicates the probabilities. The visual makers may be changed based on a threshold to provide a more "concrete" result. For instance, a threshold may be set to a default value (e.g., 0.7) at which the probability is accepted as "true" and all portions of the image with the probability that satisfies the threshold may be marked as including the depiction of the object. The users may be presented with one or more options to change the value of the threshold, and how much the users change the value of the threshold may indicate that the extent to which the default value is incorrect. The feedback from the users (e.g., changes in the value of the threshold) may be used to change the default value of the threshold. Other improvements to the machine learning model based on other user feedback are contemplated.

In some embodiments, the machine learning model may utilize multiple users' labeling of depiction of objects within images. For example, the machine learning model may merge labeling of depictions of objects within images from different users to take advantage of labeling that has already be performed. As another example, different users may be scored based on the accuracy of markings provided by the different users, and the machine learning model may be trained using different weights for different labels associated with different users. For instance, one user may more accurately mark dots within an image to indicate positions of depictions of objects than another user, and the machine learning model may be trained with the more accurate user's labeling weighed more heavily than the other user's labeling.

In some embodiments, the machine learning model may take time of images into account. For example, images and labels used to train the machine learning model may be associated with a particular time (e.g., time of image capture, season of image capture) and the time of images that are classified by the machine learning model may be used as an input into the machine learning model. Such use of timing may allow the machine learning model to compensate for different image characteristics that arises due to timing differences. For instance, identifying depictions of buildings in a day-time image may be different than identifying depictions of buildings in a night-time image, or identifying depictions of buildings in a winter image (e.g., with buildings covered by snow) may be different than identifying depictions of buildings in a summer image (e.g., with buildings not covered by snow). The timing of the image may be used by the machine learning model to account for such changes/expected changes in images due to different conditions at different times. Geolocations associated with images may further be used to improve classification. For example, the environment condition of a location in one part of the world may be different than the environment condition of another location at a particular time, and the machine learning model may take into account location depicted within the image to identify depiction of objects within images.

In some embodiments, the machine learning model may be used to detect changes in objects at a location over time. For example, the machine learning model may be trained to identify depictions of structures within images and the machine learning model may be used to determine how structures at a location has changed over time. For instance, the machine learning model may compare images of a location before a storm and after the storm to determine how structures at the location may have been impacted by the storm.

In some embodiments, outputs of the machine learning model may be used to recommend/identify collection of particular type of information. For example, the machine learning model may be trained to identify depictions of structures within images. The machine learning model may output poor/inaccurate probabilities based on images of a particular location being of poor quality (e.g., low resolution, blurring). Such images/location may be tagged so that additional images of the location may be obtained for processing through the machine learning model.

Figure 2:
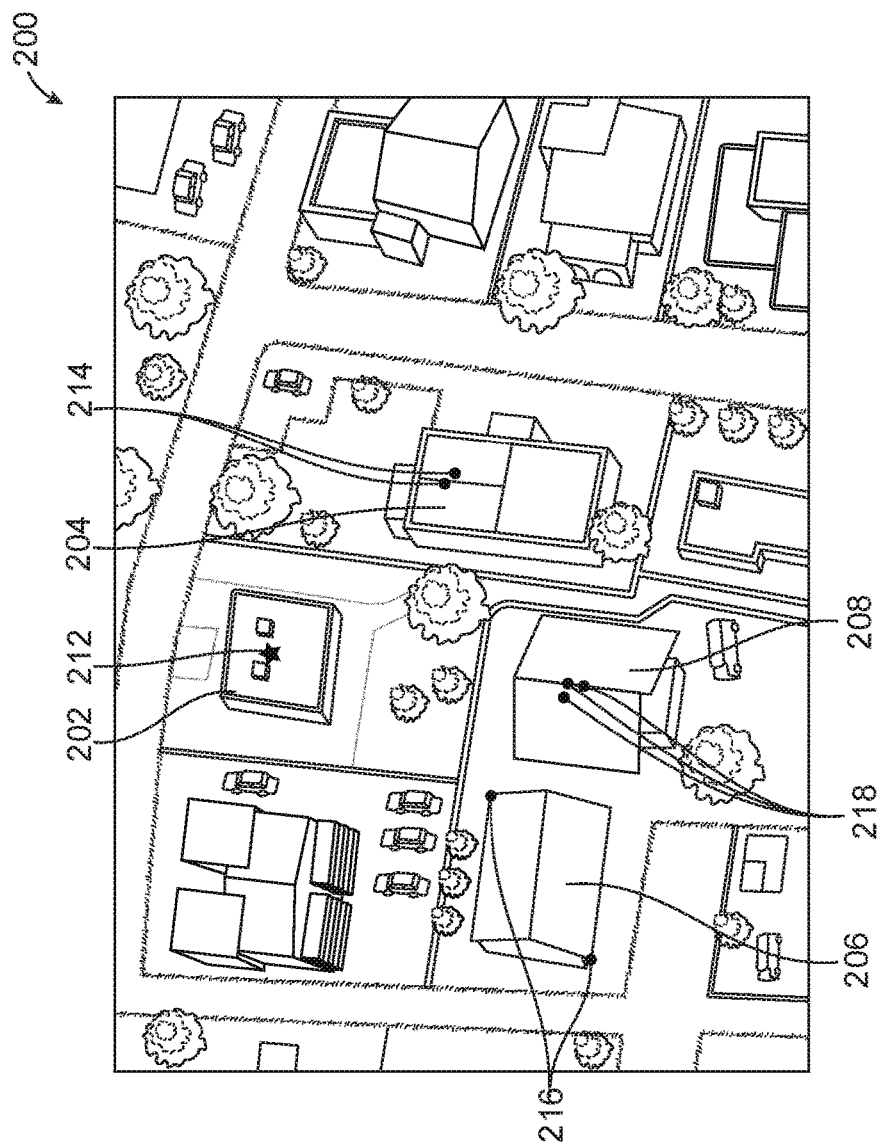
FIG. 2 illustrates example markings of sets of dots within an image, in accordance with various embodiments.

FIG. 2 illustrates example markings of sets of dots 212, 214, 216, 218 within an image 200, in accordance with various embodiments. The image 200 may include depictions of one or more objects. For example, the image 200 may include depictions of buildings 202, 204, 206, 208, and/or other objects. The image 200 may include portions (e.g., pixels) that visually represent the buildings 202, 204, 206, 208. A user's marking of the sets of dots 212, 214, 216, 218 may be received. The set of dots 212 may include a single dot, the set of dots 214 may include two dots, the set of dots 216 may include two dots, and the set of dots 218 may include three dots. A set of dots may include other numbers of dots.

The dots within the sets of dots 212, 214, 216, 218 may be positioned within and/or near depictions of objects (e.g., buildings) within the image 200. For example, the set of dots 212 may be positioned within the portion of the image that visually represents the building 202, the set of dots 214 may be positioned within the portion of the image that visually represents the building 204, the set of dots 216 may be positioned within the portion of the image that visually represents the building 206, and the set of dots 218 may be positioned within the portion of the image that visually represents the building 208. Position of one or more of the dots may indicate a particular portion of the object depicted within the image 200. For example, the position of the set of dots 212 may indicate a middle portion of the building 202. As another example, the set of dots 216 may indicate boundary portions (e.g., corners) of the building 216. As further example, the set of dots 218 may indicate the upside-down "L" shape of the building 208. Other placements of dots to indicate shape of objects depicted within the image 200 are contemplated.

A user may use different types of dots and/or different numbers of dots within a set of dots to indicate different information. For example, the use of a star-shaped dot within the set of dots 212 may indicate that the building 202 is of a particular type and/or that the building 202 has particular characteristics. As another example, the use of two dots within the set of dots 214 may indicate that a user that placed the dots had greater confidence of the identity of the building 204 than other portions of the image 200 in which only a single dot was used. As further example, the use of two dots within the set of dots 214 may indicate information on the size of the depiction of the building 204 within the image 200. Other uses of different types of dots and/or different numbers of dots within a set of dots are contemplated.

Figure 3:
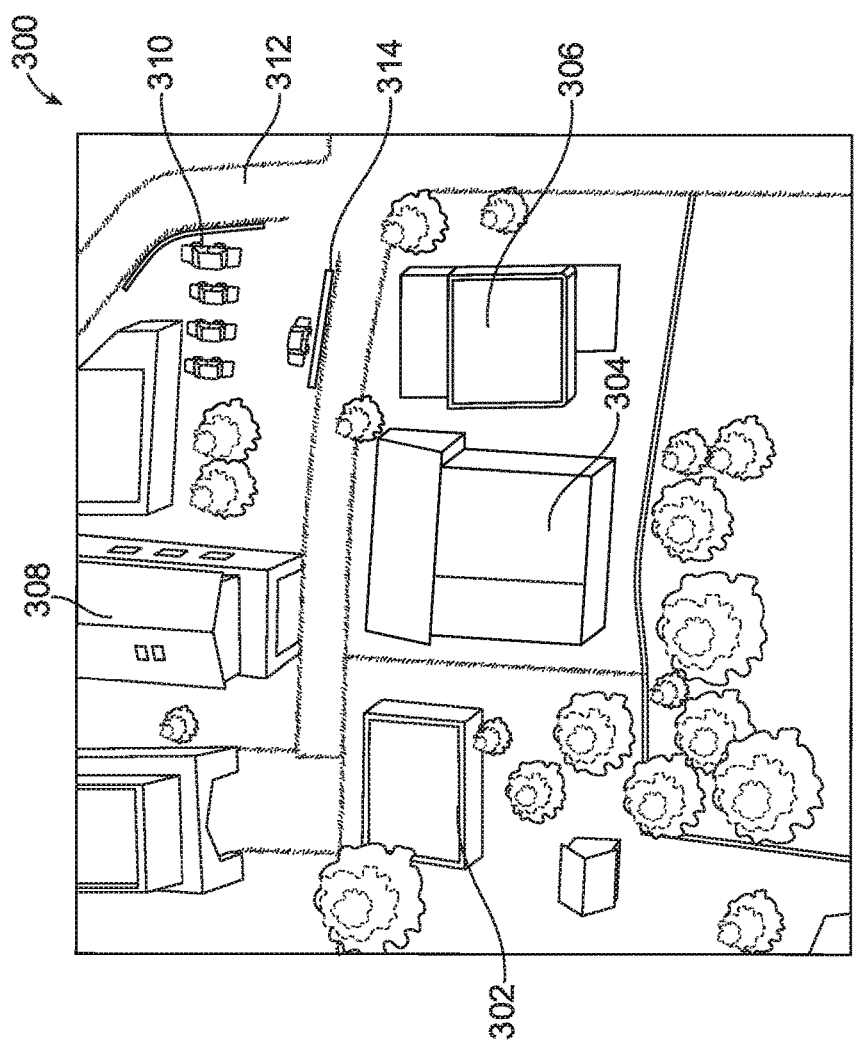
FIG. 3 illustrates an example image including depictions of objects, in accordance with various embodiments.

FIG. 3 illustrates an example image 300 including depictions of objects 302, 304, 306, 308, 310, 312, in accordance with various embodiments. The image 300 may include depictions of buildings 302, 304, 306, 308, a depiction of a car 310, a depiction of a curved road 312, and a depiction of a barrier 314. The depictions of objects within the image 300 may be identified by a classifier (e.g., machine learning model). The classifier may have been trained using labeling of images performed based on marking of dots within the images, such as shown in FIG. 2. For example, a classifier trained to identify depictions of buildings within images may be used to identify the depictions of buildings 302, 304, 306, 308 within the image 300.

One or more portions of the image 300 may be filtered from being identified as a building by the classifier based on one or more criteria. For example, the portion of the image depicting the car 310 may be filtered from being identified as a building based on the size covered by the portion being too small to be a building. As another example, the portion of the image depicting the curved road 312 may be filtered from being identified as a building based on the shape of the curved road 312 not corresponding to a shape of a building. As further example, the portion of the image depicting the barrier 314 may be filtered from being identified as a building based on the ratio of the horizontal length to the vertical length of the barrier 314 being too high to be a building. That is, the portion of the image depicting the barrier 314 may be too thin to be a building. Other filtering of image portions are contemplated.

Figure 4:
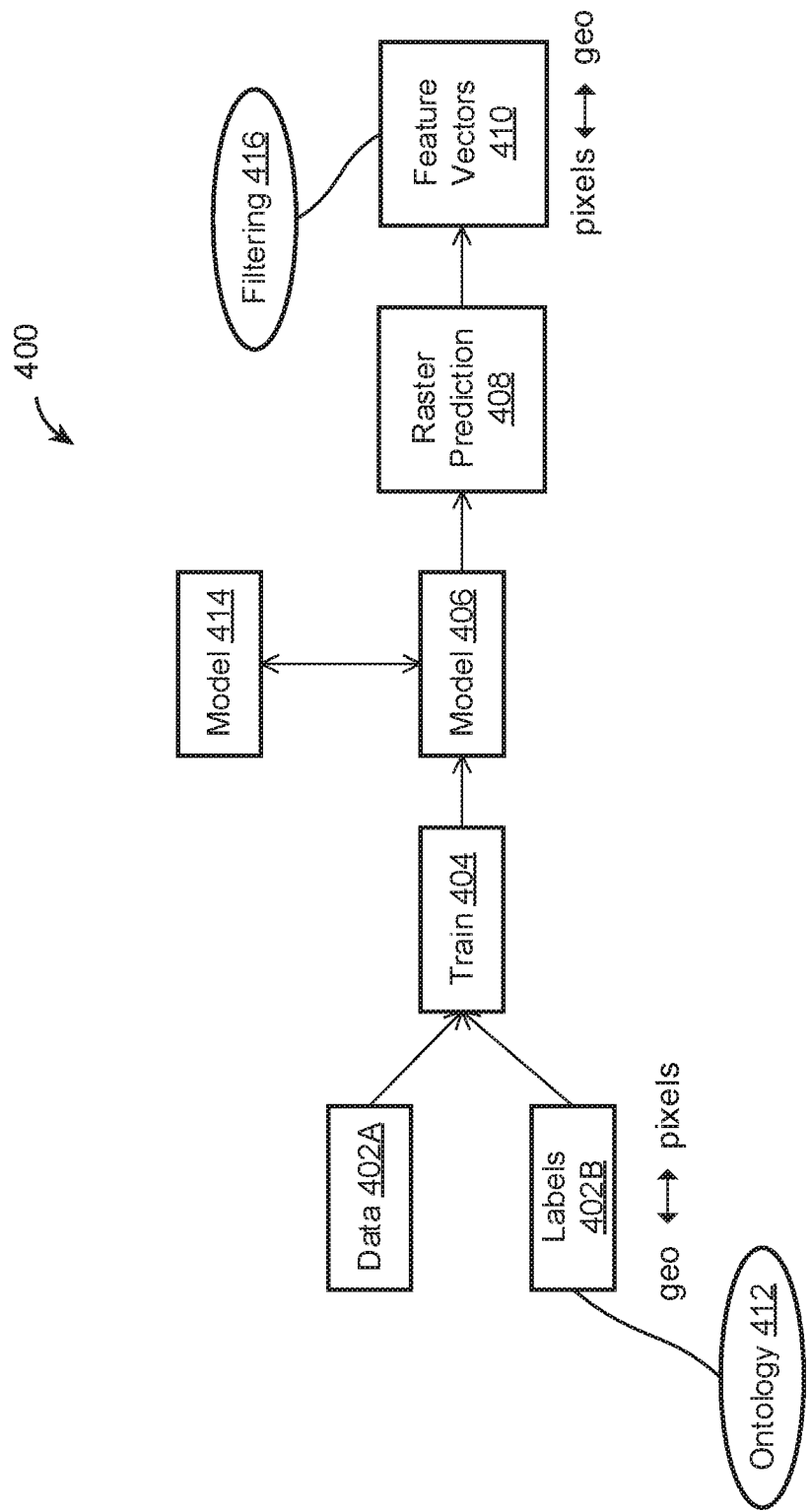
FIG. 4 illustrates an example overview for training and using a machine-learning model, in accordance with various embodiments.

FIG. 4 illustrates an example overview for training and using a machine-learning model 400, in accordance with various embodiments. In the overview 400, one or more inputs may be used to train 404 a model 406. For example, the inputs to train 404 the model 406 may include data 402A and labels 402B. The data 402A may include information stored in one or more databases. One or more transformation operations may be performed on the data 402A to prepare the data for model training. For example, the data 402A may include a combination of multiple sensor data, and the data 402A be prepared for training of the model 406 using normalization and/or merging operations. The labels 402B may include labeling of images/objects depicted within images. The labels 402B may provide for transformation of information in a geo-spatial space to a pixel space. For instance, the labels 402B may transform geolocations of objects (e.g., buildings) into labeling of corresponding pixels within images. The labels 402B may use an ontology 412 that defines a structure for object labeling. For example, the ontology 412 may define different types of objects (e.g., buildings vs vehicles) and/or different categories of a type of object (e.g., buildings with different shapes, buildings with different purposes, commercial vs residential vs government buildings). Such organization of labels may provide for use of curated labels in training the model 406.

In some embodiments, the model 406 may work and/or interact with another model 414, which has been trained on different data and/or different user input. For example, the outputs of the model 414 may be used to verify the outputs of the model 406 and/or vice versa. The interactions of the models 406, 414 may provide for retraining of one of both of the models 406, 414. One of both of the models 406, 414 may be retrained based on additional information. For example, the model 406 may be retrained based on additional classifications of data. For instance, data from additional sensor(s) may be provided as input to train 404 the model 406.

The model 406 may provide a raster prediction 408 based on its training, which may result in outputting of feature vectors 410. The feature vectors 410 may provide for transformation of information in the pixel space to the geo-spatial space. That is, predictions made by the model 406 may be transformed into information on geolocations of objects based on identification of where the objects are depicted within images. The feature vectors 410 may be processed using filtering 416, which may remove one or more results based on one or more criteria. For example, certain portions of the feature vectors 410 indicating the depiction of a certain object (e.g., building) within an image may be filtered out based on the corresponding portions of the images having sizes and/or shapes that do not correspond to the size and/or shape of a building.

Figure 5:
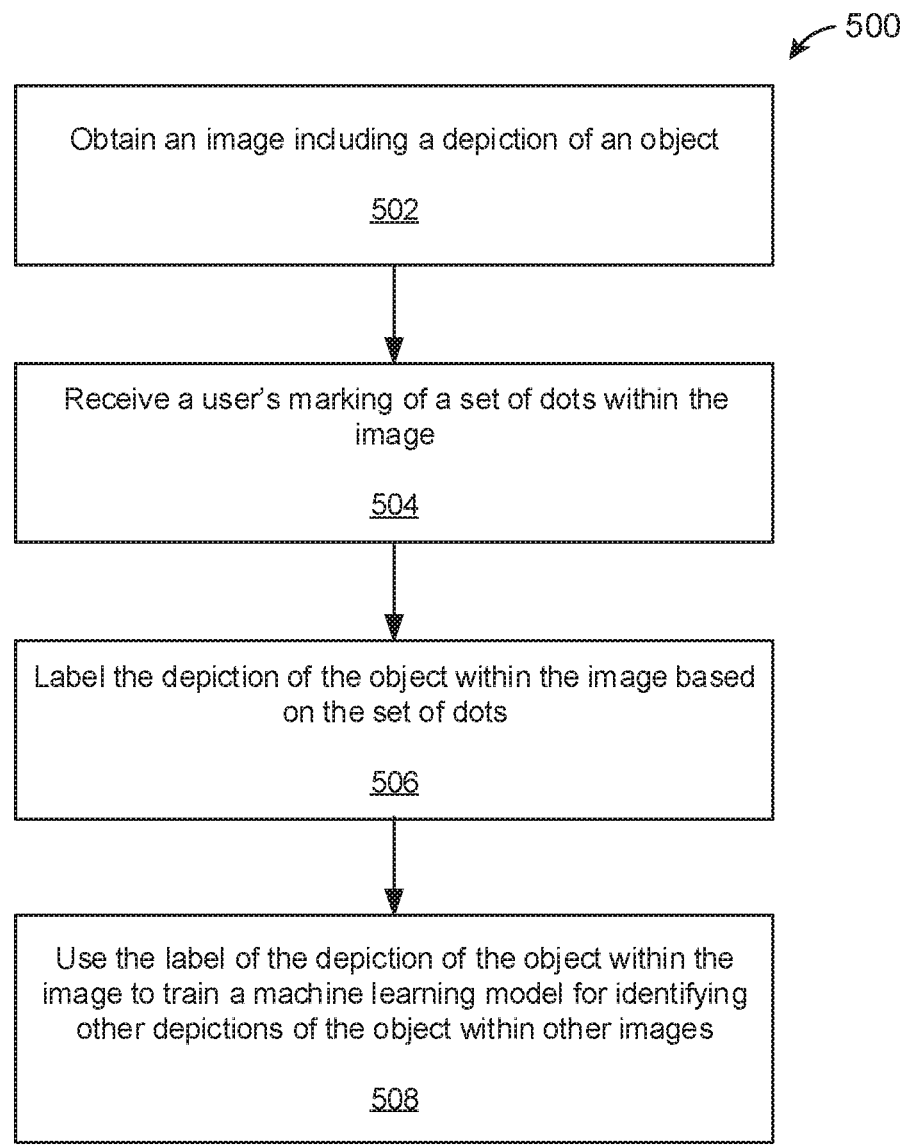
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, an image including a depiction of an object may be obtained. At block 504, a user's marking of a set of dots within the image may be received. At block 506, the depiction of the object within the image may be labeled based on the set of dots. At block 508, the label of the depiction of the object within the image may be used to train a machine learning model for identifying other depictions of the object within other images.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
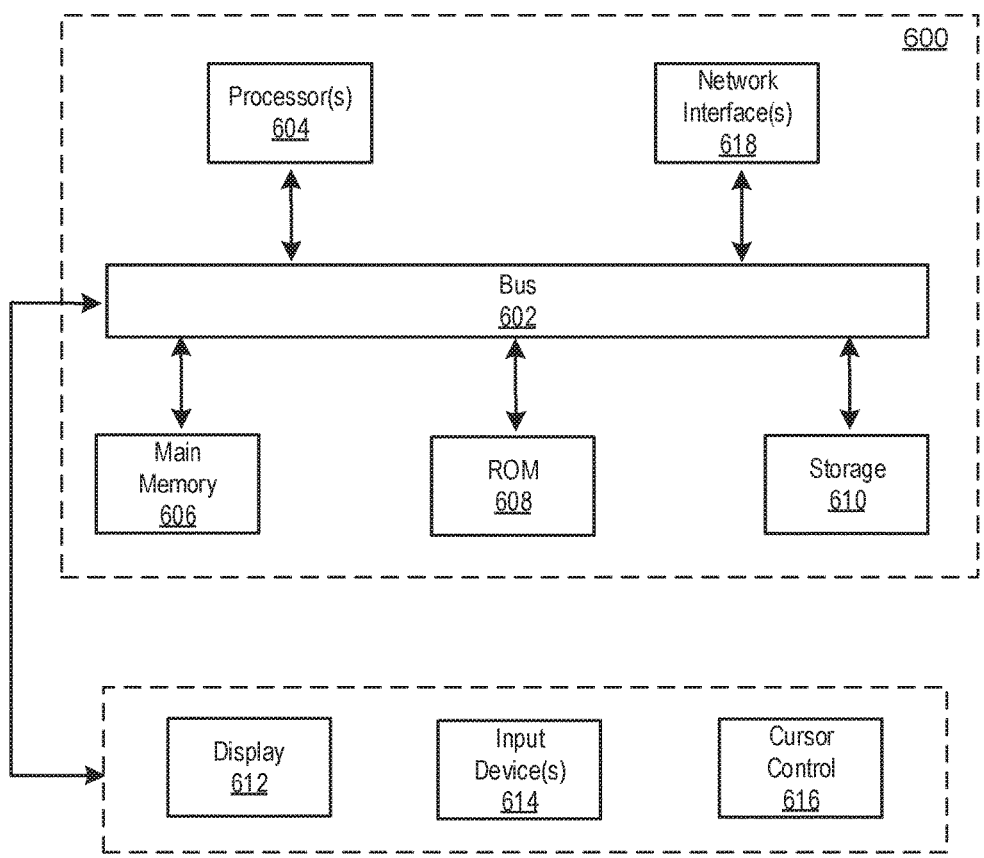
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors;
   memory storing instructions that, when executed by the one or more processors, cause the system to perform:
   obtaining an image, the image including a depiction of an object;
   receiving a user's marking of a set of dots within the image, the set of dots including one or more dots and positioned within or near the depiction of the object; and
   labeling the depiction of the object within the image based on the set of dots, wherein labeling the depiction of the object within the image based on the set of dots includes identifying a boundary of the object depicted within the image based on position of the set of dots within the image.

2. The system of claim 1, wherein the position of the set of dots within the image indicates a middle portion of the object.

3. The system of claim 1, wherein the position of the set of dots within the image indicates a boundary portion of the object.

4. The system of claim 1, wherein the position of the set of dots within the image indicates a nearby depiction of the object.

5. The system of claim 1, wherein labeling the depiction of the object within the image is further based on a number of dots within the set of dots.

6. The system of claim 1, wherein a label of the depiction of the object within the image is used to train a machine learning model for identifying other depictions of the object within other images.

7. The system of claim 6, wherein identifications of the other depictions of the object within the other images are filtered based on an object size criteria or an object shape criteria.

8. A method implemented by a computing system including one or more processors and storage media storing machine-readable instructions, wherein the method is performed using the one or more processors, the method comprising:
   obtaining an image, the image including a depiction of an object;
   receiving a user's marking of a set of dots within the image, the set of dots including one or more dots and positioned within or near the depiction of the object; and
   labeling the depiction of the object within the image based on the set of dots, wherein labeling the depiction of the object within the image based on the set of dots includes identifying a boundary of the object depicted within the image based on position of the set of dots within the image.

9. The method of claim 8, wherein the position of the set of dots within the image indicates a middle portion of the object.

10. The method of claim 8, wherein the position of the set of dots within the image indicates a boundary portion of the object.

11. The method of claim 8, wherein the position of the set of dots within the image indicates a nearby depiction of the object.

12. The method of claim 8, wherein labeling the depiction of the object within the image is further based on a number of dots within the set of dots.

13. The method of claim 8, wherein a label of the depiction of the object within the image is used to train a machine learning model for identifying other depictions of the object within other images.

14. The method of claim 13, wherein identifications of the other depictions of the object within the other images are filtered based on an object size criteria or an object shape criteria.

* * * * *